United States Patent
Relf

(10) Patent No.: US 9,866,749 B2
(45) Date of Patent: Jan. 9, 2018

(54) SYSTEM FOR PUBLISHING DIGITAL IMAGES

(71) Applicant: Scott Relf, Naples, FL (US)

(72) Inventor: Scott Relf, Naples, FL (US)

(73) Assignee: Pikmobile, Inc., Naples, FL (US)

( * ) Notice: Subject to any disclaimer, the term of this patent is extended or adjusted under 35 U.S.C. 154(b) by 278 days.

(21) Appl. No.: 14/456,551

(22) Filed: Aug. 11, 2014

(65) Prior Publication Data

US 2015/0042823 A1    Feb. 12, 2015

Related U.S. Application Data

(60) Provisional application No. 62/005,402, filed on May 30, 2014, provisional application No. 61/864,268, filed on Aug. 9, 2013.

(51) Int. Cl.
| | |
|---|---|
| H04N 5/232 | (2006.01) |
| H04N 1/00 | (2006.01) |
| H04L 12/58 | (2006.01) |
| G06Q 50/00 | (2012.01) |
| H04N 1/32 | (2006.01) |
| H04N 1/34 | (2006.01) |

(52) U.S. Cl.
CPC ......... *H04N 5/23222* (2013.01); *G06Q 50/01* (2013.01); *H04L 51/10* (2013.01); *H04L 51/32* (2013.01); *H04N 1/0097* (2013.01); *H04N 1/00153* (2013.01); *H04N 1/00156* (2013.01); *H04N 1/00159* (2013.01); *H04N 1/00161* (2013.01); *H04N 1/00167* (2013.01); *H04N 1/00169* (2013.01); *H04N 1/00198* (2013.01); *H04N 1/00244* (2013.01); *H04N 1/00307* (2013.01); *H04N 1/00973* (2013.01); *H04N 1/324* (2013.01); *H04N 1/32128* (2013.01); *H04N 1/32144* (2013.01); *H04N 1/32507* (2013.01); *H04N 1/32523* (2013.01); *H04N 1/342* (2013.01); *H04N 2201/0039* (2013.01); *H04N 2201/0096* (2013.01); *H04N 2201/3264* (2013.01); *H04N 2201/3266* (2013.01)

(58) Field of Classification Search
CPC .. H04N 5/23222; H04N 1/00159; G06F 7/00; G06F 17/30
See application file for complete search history.

(56) References Cited

U.S. PATENT DOCUMENTS

| | | | | |
|---|---|---|---|---|
| 2013/0091029 | A1* | 4/2013 | George | G06Q 20/12 705/21 |
| 2013/0124508 | A1* | 5/2013 | Paris | G06F 17/3028 707/723 |

(Continued)

*Primary Examiner* — Daniel M Pasiewicz
*Assistant Examiner* — Selam Gebriel
(74) *Attorney, Agent, or Firm* — Cohen & Grigsby, PC

(57) ABSTRACT

A system for publishing digital images wherein a mobile device (14) that stores at least one digital image generates output signals in response to operator commands. The mobile device (14) communicates with a source of digital instructions (18) thorough a communication network (16) such that digital instructions are downloaded to the mobile device. The mobile device is thereafter in selective communication with a server (12) that stores digital images, maintains a user profile corresponding to the user of the mobile device, and publishes digital images to at least one digital address (24, 26, 28, 30).

40 Claims, 3 Drawing Sheets

(56) References Cited

U.S. PATENT DOCUMENTS

2014/0040712 A1* 2/2014 Chang ................... G06F 17/212
 715/202
2014/0067955 A1* 3/2014 Christian ................ H04W 4/02
 709/204

* cited by examiner

Solution
"Pikmobile... the app that let's you express yourself when it takes more than one pik to tell your story."
Example of a piklist...
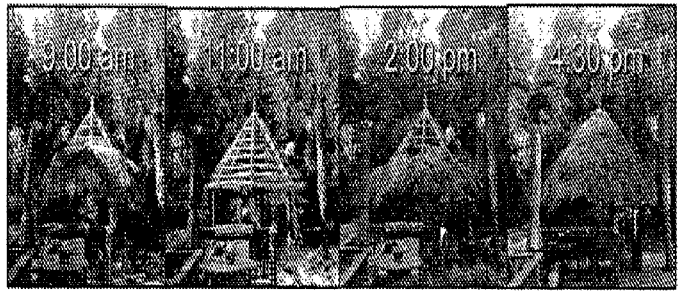
Example of a pikcombo...
FIG. 3
FIG. 2

SYSTEM FOR PUBLISHING DIGITAL IMAGES

BACKGROUND OF THE INVENTION

Field of the Invention

The presently disclosed invention concerns the transmission of digital images and, more particularly, improved systems for editing, formatting, arranging, storing, publishing and viewing digital images, whether in social media or for commercial purposes.

Discussion of the Prior Art

In the prior art, various systems have been developed for storing publishing, viewing and sharing images such as photographs and video media. Especially as used in connection with Internet communication, such images are composed in digital media and published though Internet or telephonic transmission. Examples of such communications are found in connection with systems that are associated with trade names that include: Facebook™, Twitter™, YouTube™, Flickr™, Instagram™ and others.

However, editing and publication of images in such systems has continued to be a somewhat awkward and command intensive process. There has remained a continuing need for systems and methods that are capable of more facilely and quickly arranging, cropping and otherwise editing digital images and also storing and publishing those images through a given network and viewing them on mobile and other devices.

SUMMARY OF THE INVENTION

In accordance with the presently disclosed invention, a system for efficiently, quickly and easily editing, formatting, arranging, storing, publishing and viewing digital images includes a server that communicates with multiple mobile devices through a network. Each of the mobile devices includes a mobile application that controls image editing, formatting, arranging, storing and viewing in response to user commands. The edited images are transmitted through the network to the system server that maintains a user profile and that stores the images. In response to instructions that are transmitted from the mobile device through the network to the system server, the system server publishes the images to one or more designated digital addresses.

Each of the mobile devices within the system is enabled to edit digital images through software that can be downloaded through the network to the device upon request. Once enabled, the mobile device includes features for editing single images, deriving multiple images from one original image, combining multiple images into a single image, arranging multiple images in a given display sequence, and editing images that are integrated in a display sequence.

The mobile application on each mobile device controls the storage and viewing on the device of the single images and multiple images to present the digital effects and presentation sequence and timing specified by the user that created and published the images. The system also communicates with the mobile app to control the quality, speed and security of the transfer, and storage of the images. The system also maintains a duplicate, synchronized file of all of the images that are on each user's mobile application which is used by the system, and which guarantees that there is an easily accessible back-up copy of all of each user's images which can be accessed if the user's mobile device is unavailable, lost or damaged. The mobile app is capable of viewing and editing images even when the mobile device is not connected to the network and system because of poor cell phone coverage, while flying on an airplane, etc. As soon as the mobile device is reconnected to the network and system, all of the edited images are immediately synchronized to update and maintain the duplicate file on the system and the mobile device.

The system server includes software that is responsive to instructions from the mobile devices to perform various functions including: maintaining a profile corresponding to each user of the system and their associated mobile devices; storing the images that are edited by each of the mobile devices; deriving multiple images; combining a plurality of images into a single image; and arranging images in a given sequence; as well as other functions.

The system server also provides each mobile device with access to a database of single and multiple images published by others. Each mobile device with the mobile application can view and request copies of the single and multiple images in the system database. The system controls which mobile users can view and receive copies of images in the database. The system maintains mobile user profile information to control access to viewing and receiving copies of images in the database, and also payment by the mobile user for access to view and receive copies of images in the database.

The system server also can be used in combination with one or more mobile devices to publish commercial advertising or other public announcements. For example, the system server can publish commercial images to digital billboards or display screens in response to instructions from a mobile device. In this way, a uniform commercial message is displayed to the targeted audience under the authority of a small control group or even a single user with very limited time and cost for production. The system can also be instructed to change the message that is displayed based upon fixed criteria (e.g. date or time of day), variable criteria (e.g. air temperature), and dynamic criteria (e.g. the proximity and profile of mobile devices).

BRIEF DESCRIPTION OF THE DRAWINGS

FIG. 2 is an illustration of images that are combined into a single image in accordance with the presently disclosed invention.

FIG. 3 is an illustration of images that are arranged in chronological sequence in accordance with the presently disclosed invention.

PRESENTLY PREFERRED EMBODIMENTS OF THE DISCLOSED INVENTION

Figure 1:
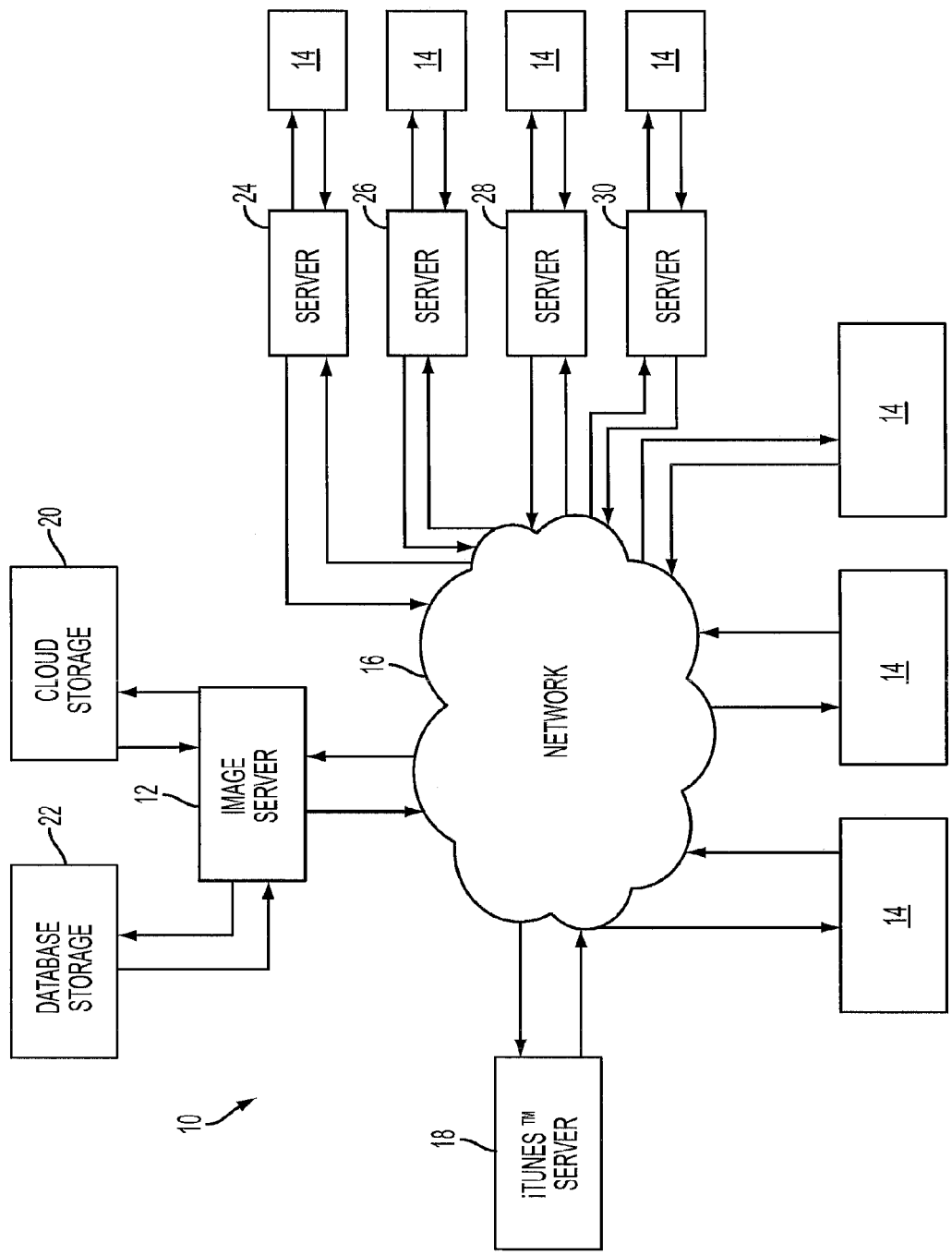
FIG. 1 is a logic diagram of a system for editing and publishing digital images in accordance with one embodiment of the presently disclosed invention.

A presently preferred embodiment of the invention is illustrated in FIG. 1 wherein a system 10 includes a server 12 that communicates with multiple mobile devices 14 such as a cell phone, iPad, tablet, PC or other mobile device through a network 16 such as an Internet or cell phone network. Communication between mobile devices 14 and server 12 is enabled though an application program that is downloaded to the mobile device from a commercially available source such as an iTunes™ server 18 or other source of mobile applications. Once the mobile device is enabled, the application program resides on the mobile device 14 and provides enhanced capability to edit, store and view digital images.

Once the mobile application is downloaded to the mobile device 14, the mobile device edits digital images according to user commands. The mobile application includes an image viewer and multiple features for editing images including capability to: edit a single image; derive multiple images from one original image (e.g. zoom sequence or variations in image color or framing); special effects for images and text; combine several images into a single image (e.g. photo collage or layered photos); arrange multiple images in a given display sequence; and afford editing capability for images that are arranged in display sequence. In some embodiments, the image viewer includes camera functionality such that the camera is optimized for the implied preferences of the user of the mobile device.

Images can be sourced directly from a camera on the mobile device 14 or from a camera roll or other digital storage on the mobile device. In addition, images can be drawn through server 12 from other mobile devices 14 such as cell phones or iPads, or from the data storage either in the cloud 20 or a database 22. In some embodiments, images from cloud 20 or database 22 can be proprietary or have restricted availability including the requirement for payment. Linkage between server 12 and other mobile devices 14 can be through the network 16 and directly to mobile devices 14 that are enabled to communicate with server 12. Additionally, linkage between server 12 and other mobile devices 14 can be through the network 16 to other commercially available platforms such as a Facebook™ server 24, a Twitter™ server 26, an SMS server 28, or an email server 30.

The downloaded mobile application further enables the mobile device 14 to communicate with server 12 and cause the server to publish the edited photos according to the user's commands. For example, the user may command the mobile application to instruct server 12 to send a single image to a given SMS or email address. Alternatively, or concurrently, the mobile application may instruct the server 12 to send the image to multiple SMS or email addresses or to post the image to a Facebook™ or Twitter™ account. Additionally, the mobile application may instruct the server to post the image at an address that can be accessed by other enabled mobile devices 14, or a defined subset of such mobile devices.

In some embodiments, server 12 maintains a profile for each enabled mobile device listing the identifiers, preferences, associations and other data associated with the respective mobile devices. Also in some embodiments, the profile further maintains a list of all the postings associated with the respective enabled mobile device. Also in some embodiments, server 12 maintains a chronological list of the posts associated with a given enabled mobile device together with posts from other enabled mobile devices that are authorized to access such posts.

Server 12 stores all edited versions of images from an enabled mobile device. Such images can include multiple images derived from a single image; combined images; image display sequences in the nature of an album or a sequence of events; and edited versions of all the forgoing. The mobile application enables editing capability for both images and text. FIG. 2 illustrates an example of several combined or composited images. FIG. 3 illustrates an example of an image that displays a chronological sequence of events.

When instructed by the mobile application according to user commands, the server 12 may have additional capability to chronologically list images that are acquired by the mobile application and search and sort those images according to predetermined criteria such as type, location, date/time, source (e.g. device type, PikStore, etc.) username or creator, title/caption/comments (incl. hashtags/usernames in the test) or other variable. The acquired images can be sourced from the mobile device camera, the mobile device memory, another enabled mobile device, a commercial platform, cloud storage 20, or server database 22. In some embodiments, server 12 can control access to limited-access images (such as, for example, celebrity images and autographs or event tickets) by affording access only to a specific class of mobile devices 14, such as those devices whose profile identifies it as a member of a specific association or a ticket-holder or attendee of a specific event, or users who are identified with a unique password that they have received or purchased. Also in some embodiments, server 12 has the capability of certifying images by superimposing letters, a logo, a watermark or other authorization feature in, over or adjacent to the image. In those embodiments, the server 12 can also have capability to discriminate images that are properly and necessarily certified (e.g. the use of "proof" on an image that is offered for sale).

Server 12 can store images as unique lists that act like folders with the images in a specific sequence and accompanied by specific data (comments, "likes", permissions, etc.) that are designated through the mobile application according to user commands. The folders can contain the images of any type and in any combination according to user commands. In some embodiments, the images can be edited and also can be accessed by another mobile device that is authorized for such access.

Server 12 manages all images that are incoming to a given mobile device from another source through a gateway where server 12 accepts or rejects the images according to instructions from the mobile application as determined by user commands. From the gateway, the images can be added to an image sequence or otherwise manipulated by server 12 according to user commands to the mobile application.

Server 12 further has the capability to control which users of the system have permission to view, obtain copies, share and edit images and other digital content; as well as which users have permission to add images, remove images, or edit multiple images in a given display sequence.

Server 12 further has capability to combine a digital image or images with text messages that can be posted or that can be sent to other mobile devices, PC's or other users. This messaging feature is advantageous in that it affords the user the greater capability for editing and manipulation of images as previously explained in combination with the text message. This is in contrast to messaging systems that are known in the prior art and for which image editing is relatively limited and difficult.

Server 12 further has the capability to control which mobile users are authorized to view and receive copies of certain images and other digital content such as sounds for combination with images, or specific image editing capabilities of the mobile application with or without payment. In some embodiments, access to the system is authorized for a user to transfer images and other digital content to the system from a mobile device or other device for the purpose of being offered to other users to view and receive copies in exchange for payment.

Server 12 further has the capability to combine a digital image or images with sound that can be posted or sent to other mobile devices, PC's or other users. This sound feature affords the user with the capability to record sound using the mobile device or to use other sound and sound effects in combination with images. This is in contrast to other messaging and image publishing systems that are known in the prior art for which combining images and sound is relatively limited and difficult.

The presently disclosed invention is useful in a social networking environment in which mobile device users can express themselves primarily through images or through a combination of images, text and sound. However, its application is not limited to pure social media applications. It can be used with social media in combination with commercial promotion and even in the context of commercial promotion alone. For example, FIG. 4 illustrates one embodiment of how the disclosed invention could be applied in the context of a commercial promotion.

Figure 4:
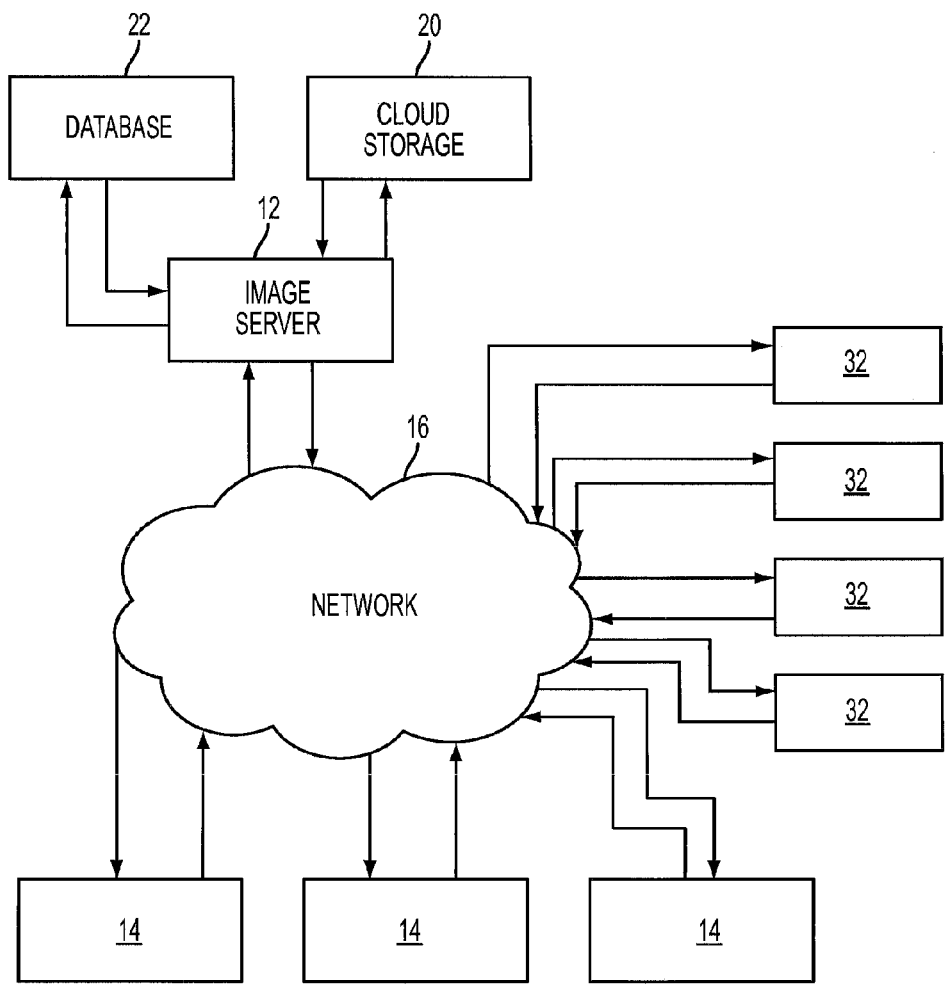
FIG. 4 is a diagram of one example of a modified system in accordance with the presently disclosed invention wherein the system for editing and publishing images is directed to commercial advertising.

In FIG. 4, a digital image is edited and formatted from a user's mobile device in the same manner as described in connection with FIG. 1. However, in the system of FIG. 4, the output of server 12 is transmitted to one or a multiple of display screens 32 such as in-store displays or such as highway or other display screens. Server 12 controls device access to a given screen or set of screens in the same manner that it limits access to particular image content to a specific class of mobile devices (e.g. members of a club). In another embodiment, personalized image content can be transferred to specific mobile devices and viewed using the mobile application on those devices or transmitted to the mobile phone address or email address of individuals.

In this way, the image is easily and quickly published to a targeted audience. The message can be easily and inexpensively changed or edited by user commands to an enabled mobile device 14 and instructions from the mobile device that are transmitted through network 16 to server 12. At the same time, the message content is efficiently managed by a small control group or even a single person. The system can also be instructed to change the message that is displayed based upon fixed criteria (e.g. date or time of day), variable criteria (e.g. air temperature), and dynamic criteria (e.g. the proximity and profile of mobile devices).

From the forgoing description, it will be apparent to those skilled in the art that the disclosed invention facilitates the creation, sequencing and publication of images that communicate stories. The stories can be created by individuals or by groups of system users that are collaborating together. The stories can be told though images alone or through visual images in combination with audio and/or text. In some cases, the images can be acquired from social media sources such as social networking sites. The stories can be created over time with images, text and audio being added from time-to-time. The contribution can be made by one or multiple contributors and can be acquired from multiple sources, created by a single author, or created by a group of collaborative authors. The creators of the story can decide to limit publication of the story a particular individual, a group of select individuals, or it can be available to the public without restriction.

It will also be apparent to those skilled in the art that the disclosed invention affords the authors of stories the opportunity to sell copies of their story to others. The story authors can do this by conditioning access to the all or part of the story upon condition of payment by the system user who is interested in viewing the story. Upon payment, the interested party can be granted access to the system so as to allow them to view the entire story.

In a similar way, system users can purchase particular images for use in their own story or for other purposes. For example, system users can make images that they want to sell available on a site that is accessible by the system server. Images that are being made commercially available and are posted to that site can then be taken or copied from that site by other system users upon payment for such right.

In some cases, images can be sold or purchased by persons who are not users of the system. For example, an author who is not a system user can pay a fee for access that will allow them to post their image to the site that is accessible to the system server. System users can then view the image or story and decide whether to purchase it. Similarly, the image can be in the way of an advertisement for a product or service that is not directly available from site or that it linked to another site from which the product or service can be purchased. In that case, the third party is not selling image that is posted to the site, but merely paying to post the image and thereby use it to promote the sale of goods or services from another venue. The posted image can be associated with one or more digital addresses that correspond to other mobile devices on the system or with devices that are not system users but for which permission has been granted for such images to be pushed to them.

Those skilled in the art will also understand that the disclosed system can include digital addresses that correspond to advertisement platforms such as wayside billboards. In that case, a system user (or a non-user who pays to have the images published) can cause the system to publish images to one or more advertisement platforms. In this way, the advertising image or message and be easily modified or replaced. Dynamic images or text can also be used.

Features and capabilities of the disclosed invention are further described as follows:

Create PikLists (collections of images) (PLs)—using one or more Piks (images) sourced from;
  The camera (in the app)
  Piks saved from other users' PLs (Pik'd used as a verb)
  The PikStore in the app
  The iPhone Camera Roll
  And from other photo/editing apps via APIs
Edit PikLists—once PikLists are created, each Pik and/or the overall PL can be edited
  The Piks can be cropped, filters applied, frames added, etc.
  Data can be added to each Pik; GPS location, time/date . . . even things like heart rate, air temperature (all from the phone or APIs with other apps)
  The PL can be sequenced, and other effects added to the PL to determine transitions, etc
  Text can be added in the form of Pik captions, text overlays on the Piks, PL titles, etc.
  Other effects like sounds can be added to the PL (user-created or obtained thru the PikStore)
View the PikStream—chronologically sequenced PLs that include;
  PLs created by the user
  Also PLs from other users that are being Followed (all of a user's PLs) or Watched (just a specific PL)
  And 3rd Party advertisements in the form of a PL (e.g. every 20th PL is an advertisement)
Store PikLists and Piks—All of a user's PikLists and Piks are stored;
  All PikLists created by the user
  All Piks in the user's PLs . . . also stored as individual Piks All Piks saved (i.e. Pik'd the verb) from other user's PLs (the user that created the Pik can choose whether the Pik is Pik-able, and also whether it is edit-able)

All Piks obtained from the PikStore (some are free, others must be purchased)

Share PikLists—primarily through the PikStream

PLs are all posted in the PikStream; with the user choosing who can view it (only the user, specific other users, or all users)

PLs can be sent as a PikMessage (within the app itself) to one or more other PikMobile users PLs can be shared via other apps (Facebook, Twitter, etc.) plus via email and SMS (Text Message) with anyone whether they are a PikMobile user or not PLs that are shared outside the PikMobile app (Facebook, Twitter, email, SMS, etc.) may be fully viewable outside of PikMobile and/or have a preview with a link that directs the user into the PikMobile app to view the PL inside the app itself (if not a user, immediate sign-up is fast and easy)

Viewing PikLists—primarily through the PikStream

PLs posted by a user appear in their own PikStream

Users may choose to have PLs appear in their PikStream that are created and/or shared by other users; specifically they can 'Follow' another user to see all of their PLs, or they can 'Watch' one or more of another user's specific PLs, and not see all of the other user's PLs (that are not being Watched)

Users can view PLs by searching for them based upon username, hashtag, PikList Title, location, etc.

Communicate with other users—within the app

Make comments about Piks and/or PLs

'Like' Piks and/or PLs; including the option to choose a specific type of like (e.g. Love It, Congratulations, Dislike, etc.)

Send PikMessages to other users with either text, attached PLs, or both

Blog with PikLists

PikLists are dynamic; and permit the user to add additional Piks (one time or repeatedly) to the PL after it is posted . . . each time Piks are added, the PL is re-posted with the newest Pik visible in the PikStream . . . and all the Piks (old and new) visible by scrolling left and right Collaborative PikList Creation/Editing PikLists can be collaborative; with other users or all users permitted to add Piks to the PL PikList collaboration can be based upon a list of users, or other permission criteria such as location (GPS-defined, with iBeacon™ validation, etc.), user profile/demographics ('pushed' by PikMobile System), user preferences ('pulled' by user), etc.

PikLists as Commercial Promotion

The disclosed invention includes the following structure and functionality:

The user can access the PikStore by

Touching the PikStore button in the main toolbar . . . will add Piks into the Pik'd Section of the user profile (to subsequently add them to a PikList)

OR choosing the PikStore from the Camera Screen's 'Roll Icon' Menu . . . to add the Piks immediately into the PikList Editor as either the initial Pik (starting the Create PikList process), or adding the Pik into a PikList already in the process of being created Images in the PikStore are arranged as PikLists for the user to view them A Pik can be in more than one PikList (e.g. Empire State Building in BOTH the 'NYC Landmarks', and the 'World's Tallest Buildings')

Search Results in the PikStore can be displayed as PikLists (and other ways too?)

The user touches the Pik button under the PikStore Pik to select it . . . then the user makes a choice Option One—Add to 'Shopping Cart' . . . which looks a lot like the PikList Editor Screen (including the captions for each Pik already filled in . . . and the price for the Pik displayed)

Option Two—Create a PikList . . . which is the PikList Editor Screen (caption is filled in, but can be edited)

Option Three—This is not a choice, rather a default that adds the Pik into the PikList already in the process of being created . . . only if the PikStore was accessed from the Camera Screen 'Roll Icon' Menu NOTE: No matter where the Pik goes at this stage, it hasn't yet been paid for . . . so it need to have the price displayed and the Pik must also be visually identified as 'pending purchase' (e.g. with a green border)

The user can either stop at this point with only one Pik from the PikStore . . . or continue to 'Add Pik' until they have completed the current 'shopping trip'

When the user is ready to stop shopping, they trigger the checkout by

Option One—for the Shopping Cart they touches the Done (or Purchase) button which triggers the in-app purchase process (e.g. iTunes Password, etc.) . . . and then the Shopping Cart PikList posts to the User Profile as a Private Post and all of the Piks appear in the Pik'd section Option Two/Three—For the Piks from the PikStore being placed into a PikList (either by themselves or mixed with other non-PikStore Piks) . . . the user touches the Arrow (or Purchase) button which triggers the in-app purchase process (e.g. iTunes Password, etc.) . . . and then the PikList Options Screen appears so the user can complete the Post (which includes the PikStore Piks)

NOTE ONE: The Piks in the PikStore are defaulted to be un-Pikable by other users . . . . AND instead of a greyed-out Pik button there is an icon (e.g. PikStore Icon) that is a link to the PikStore where that Pik is immediately displayed for a user to view and if desired, purchase it NOTE TWO: All of the Piks available in the PikStore are combined with a 'watermark layer' which is a virtual clear cover sheet that has a PikMobile lettering or other watermark lightly covering the image; the purpose is to both allow the user to get a good look at the Pik they are considering for purchase, while simultaneously making the taking of a 'screen grab' copy of the image unsatisfying by virtue of the images having an obvious watermark across it Features of the disclosed invention include the following:

The basic concept of the PikList is unique; multiple images specifically arranged in sequence with accompanying data for the PL as a whole and each image individually (titles, captions, comments, likes, etc.) and with the option to move forward and backward in the sequence with specific transitions and effects (including visual treatments, animations, auto-advance, sounds, etc.)

The PikStream is unique in that it is exclusively comprised of chronologically sequenced PLs with the visual presentation and the user interaction (and options) optimized for social-networking on a mobile device.

The visual presentation of the PikStream is unique in the way that the PikStream scrolls vertically and each of the PLs within the PikStream scrolls horizontally . . . with both the PL's in the PikStream arranged chronologically (most recent at the top) and the Piks within the PLs arranged chronologically (most recent to the right)

The concept of 'Merging' a new PikList with an existing PL is unique in the social networking context; it makes a PL dynamic in that it can be repeatedly updated by the creator of the PL to create an 'image blog' . . . a chronologically sequenced (diary-like), ever growing number of Piks (each with captioning, effects, etc.) that offers other users who view the PL, social networking options (comments, likes, etc.) continuously throughout the dynamic updating over time The concept of 'Merging' a new Pik with an existing PikList (see last bullet) is also unique outside of social networking; it makes it possible to create a chronological record (Pik image, plus associated Pik data) of anything either manually or automatically . . . for example manually take a series of Piks each with GPS data to create turn-by-turn driving directions . . . or automatically take a series of Piks each with temperature to record the weather. trends . . . or manually/automatically take Piks of all of your meals each with date/time to record your diet . . . plus all of these PikLists can be private for the user or sharable/viewable by any other user (e.g. your Doctor)

The concept of 'Dynamic Discovery' combines the uniqueness of a dynamic PikList with a user directed search request based upon username, Pik captions, hashtags, etc; and the results of the search are presented to the user in a PikList format which delivers a unique viewing experience of the images that is dynamically and automatically created by the PikMobile system . . . plus all of the images presented are available to be shared, Pik'd, or even purchased if they're in the PikStore The concept of 'Watching' a PikList is unique in the social networking context; it allows a user to specifically view only a specific PL created by another user (and receive notifications whenever it is updated) without the requirement to view any other PLs created by that same user (as is the requirement with Facebook, Instagram, etc.)

The concept of 'Letting others edit' a PikList is unique in the social networking context; it expands the concept of a PL to not only allow the user to add new Piks to the PL, delete Piks from the PL, edit the Piks already in the PL, and change the sequencing of the Piks within the PL . . . but in addition the user can collaborate with one or more other users by granting them permission to do the same things to the PL (add, delete, edit, re-sequence) that the user can already do themselves (e.g. all the attendees at and event can collaborate to pool their Piks of the event)

The concept of a Pik'd image is unique; it allows any user add a copy of anyone else's Pik (a noun) to their collection of Piks . . . where they can view it, add it to a PikList, and share it with other users . . . all Piks that are posted or shared have a 'Pik' (a verb) button right below the image, touching it causes that Pik to be Pik'd . . . and every user has a section of their app that stores all of the Piks that they have Pik'd. Of note, the creator of a Pik can choose to restrict that Pik so that it cannot be Pik'd . . . or allow it to be Pik'd but not edited . . . or available to be Pik'd and edited by all users (the default setting)

The capability of the System to control each Pik's image presentation, visual overlays, image data, and permissions (e.g. who can view, edit or Pik the image) is unique with regard to its capability to limit/manage/monitor the sharing and use of Piks created by users or obtained from the PikStore . . . plus overlay signatures, logos etc. can be superimposed as a 'layer' over the Piks independent of the Pik itself . . . so that a 'screen grab' copy of a branded or signed Pik would not include the image data stored by the System . . . and the Pik would lose its 'certification of authenticity' . . . users could easily identify the Pik as a copy because the System wouldn't present the certifying visual cues like borders or logos . . . this is the digital equivalent of the special tag with the NFL logo hologram that identifies official NFL apparel The concept of 'Specific Likes' is unique in some ways within the social networking context; any user can 'Like' any Pik . . . and the app keeps a running total of how many Likes each Pik has accumulated (and presents it right below the Pik) . . . the unique aspect is the ability of a user to choose a specific type of like (Love It, Congratulations, Dislike, etc.) AND have the app reflect the ongoing cumulative number of each specific type of Like right below each Pik (along with the cumulative grand total of Likes of all types)

The concept of the PikStore is unique in the way that it creates a digital marketplace that unites users in search of images with the providers of images; including large companies (e.g. Disney, NFL, Getty, etc.) as well as individuals/small companies who can self-load their images into the PikStore. The PikStore will leverage the concept of a PikList to present the Piks (images) that are available, and the concept of an image being Pik'd (verb) to request permission to copy the Pik (image). The PikStore will also make multiple Piks available as PikLists, as well as offer subscriptions to PikLists that are serving as Dynamic PikLists with Piks being added periodically (e.g. Dallas Cowboys 2014 Game Highlights). In addition to Piks and PikLists, the PikStore will make available for sale . . . premium editing tools (e.g. filters, frames, etc.) as well as sounds and other items that can be used in the creation of PikLists The concept of a PikStore is even broader than the basic presentation of images for purchase and viewing on the PiKMobile App and sharing via the app. The PikStore creates an entirely new virtual marketplace to distribute and sell digital content (images, sounds, etc.) that will include; large-scale offerings of content corporations with copyrighted content, offerings of non-copyrighted content that has value simply because of the convenience of accessing it with the Pikmobile app, and even self-service distribution of content by individuals and small businesses who can load the content into Pikmobile themselves so as to take advantage of the PikStore's large number of users on the app combined with the capability to execute the commercial transaction of digital content for sale to those users. Pikmobile will even offer the ability for a user to purchase the content on the app and request a copy (perhaps a higher resolution/quality copy) of the content be sent to another device (e.g. a personal computer, printer etc.) for use outside of the app (with or without an additional charge).

I claim:

1. A system for managing digital images, said system comprising:
   at least two mobile devices, each of said mobile devices generating output signals in response to operator commands and capable of storing at least one digital image;
   a communication network that is in selective communication with said at least two mobile devices;
   a source for digital instructions that are downloaded to a respective one of said mobile devices through said communication network in response to operator command signals to the respective one of said mobile devices, said downloaded digital instructions being installed in said respective mobile device and cooperating with said respective mobile device to manage digital images that are stored on the mobile device in response to operator commands to the mobile device, said downloaded digital instructions also cooperating with said respective mobile device in combination with payment confirmation to restrict availability of user access to view and publish digital images; and
   a server that stores digital images and that is in selective communication with said at least two mobile devices through said communication network, said server having a set of user profiles and also being responsive to input signals to said server through said communication network from at least one of said mobile devices, said server cooperating with one of said mobile devices to create, edit and publish stories that include at least one image, said server cooperating with one of said mobile devices to condition access to digital content of all or part of said stories in response to payment confirmation, said stories being published to at least one digital address in response to said operator commands.

2. The system of claim 1 wherein said digital instructions that are downloaded on said mobile device includes an image viewer and manages at least one digital image that is stored on said mobile device by at least one of the following;
   editing a single image;
   deriving multiple images from a single image;
   combining multiple images into a single image;
   arranging multiple images in a display sequence;
   editing images that are integrated in a display sequence; and
   sorting images according to selected criteria.

3. The system of claim 1 wherein the digital instructions that are downloaded on said mobile device control the storage and display of digital images on the mobile device in response to operator command signals to provide special effects, presentation sequence, and presentation timing of digital images displayed on the mobile device.

4. The system of claim 3 wherein said digital instructions that are downloaded on said mobile device control the storage and display of digital images on the mobile device at times other than when the mobile device is in communication with said sever.

5. The system of claim 1 wherein said server communicates with said digital instructions that are downloaded on said mobile device through said communication network to control the quality, speed and security of data that is exchanged between said server and said mobile device.

6. The system of claim 1 wherein said server duplicates and stores images that are stored on each mobile device in said system.

7. The system of claim 6 wherein said digital instructions that are downloaded on said mobile device control the storage and display of digital images on the mobile device at times other than when the mobile device is in communication with said sever and wherein said server duplicates said images after said mobile device is in communication with said server.

8. The system of claim 1 wherein said server includes digital instructions that are responsive to data signals from at least one of said mobile devices, said digital instructions in said server causing said server to maintain a profile that corresponds to each respective user of each respective mobile device.

9. The system of claim 1 wherein said server includes digital instructions that are responsive to data signals from at least one of said mobile devices, said digital instructions in said server causing said server to perform at least one of the following:
   storing digital images that are edited by at least one mobile device that is in communication with said server through said communication network;
   deriving multiple images from digital images that are stored in said server;
   combining two or more images into a single image; and
   arranging images in a given sequence.

10. The system of claim 8 wherein said server includes digital instructions that are responsive to data signals from at least one of said mobile devices, said digital instructions in said server causing said server to afford access from at least one mobile device through said communication network to digital images that the server has received from another mobile device and published to a digital address.

11. The system of claim 10 wherein the server uses said profile to control at least one of:
   said access to digital images that are published by the server; and
   payment for said access to digital images that are published by the server.

12. The system of claim 1 wherein said server publishes data to a multiple of digital addresses in response to data signals from at least one mobile device that is in communication with said server through said communication network.

13. The system of claim 12 wherein said server publishes data to at least one digital address in accordance with at least one of;
   fixed criteria;
   dynamic criteria; and
   variable criteria.

14. The System of claim 1 wherein said images from said mobile device are sourced from a camera on the digital device.

15. The system of claim 14 wherein said digital instructions that are downloaded on said mobile device include an image viewer that manages camera optimization of the mobile device according to the implied preferences of the user of the mobile device.

16. The system of claim 1 further comprising at least one of:
   a database that is in communication with said server through said communication network; and
   a cloud data storage, and
   wherein said server includes digital instructions that are responsive to data signals from at least one of said mobile devices, said digital instructions in said server causing said server to afford access from a first mobile device through said communication network to digital images that the server has received from at least one of the following:

a second mobile device that is included in the system;

said database that is in communication with said server through said communication network; and said cloud storage that is in communication with said server through said communication network.

17. The system of claim 1 wherein said digital address is associated with at least one commercially available server.

18. The system of claim 8 wherein said profile includes selected data that is associated with the respective mobile device.

19. The system of claim 18 wherein said profile further includes postings that are associated with the respective mobile device.

20. The system of claim 2 wherein said digital instructions that are downloaded on said mobile device also manage text that is stored on said digital device.

21. The system of claim 1 wherein said server stores digital images according to variables that are selected according to operator commands to the mobile device.

22. The system of claim 1 wherein said server includes a gateway that is responsive to operator commands to a selected mobile device to cause said gateway to manage digital images that are incoming to said selected mobile device from another device in said system.

23. The system of claim 9 wherein said digital instructions in said server further cause said server to perform at least one of the following:

controlling the digital addresses that are enabled to manage digital images and text; and enabling selected digital addresses for editing digital images and text.

24. The system of claim 1 wherein said server includes digital instructions that are responsive to data signals from at least one of said mobile devices, said digital instructions in said server causing said server to manage digital images in combination with digital sound.

25. The system of claim 10 wherein said server publishes digital files to a group of selected digital addresses in accordance with said profile that corresponds to each respective mobile device.

26. The system of claim 1 wherein said managing digital images by said downloaded digital instructions includes at least one of: creating, editing, combining with text, combining with sound, combining with other data, sequencing, saving, storing, synchronizing, posting and sharing digital images.

27. The system of claim 10 wherein said access from at least one mobile device through said communication network enables exchanging between different mobile devices at least one of: user profiles, links, following, watching, messaging, commenting, liking, and copying digital images.

28. The system of claim 1 wherein said downloaded digital instructions enable command signals to said mobile device to cause said server to search for at least one of;

digital images, users of other mobile devices.

29. The system of claim 28 wherein said search is based on selected search criteria.

30. The system of claim 26 wherein said managing said digital images is accomplished at intermittent times.

31. The system of claim 27 wherein said exchanging between different mobile devices enables a plurality of users to cause said server to publish digital images that are selected by respective users to a selected digital address.

32. The system of claim 1 wherein said downloaded digital instructions enable command signals to said digital device to communicate with said server through said communication network and cause said server to control access to digital images that are stored on said server.

33. The system of claim 32 wherein said server is caused to allow access to selected digital images to at least one of: only one digital device; only selected digital devices;

and any digital device.

34. The system of claim 11 wherein said payments by a user determine the range of that user's access to the capabilities of said server.

35. The system of claim 34 wherein the range of said user's access is measured by at least one of: a number of digital images; selected system capabilities; and other system users.

36. The system of claim 1 wherein said at least one digital address corresponds to a commercial site.

37. The system of claim 36 wherein said commercial site offers the sale of digital images.

38. The system of claim 36 wherein said commercial site offers the sale of digital instructions that enable editing of digital images.

39. The system of claim 29 wherein said search criteria includes the geographical location of mobile devices that are included in the system.

40. The system of claim 39 wherein said images that are published to said at least one digital address are selected in accordance with the geographical location of the mobile device.

* * * * *